United States Patent [19]

Moncrief

[11] Patent Number: 5,275,565
[45] Date of Patent: Jan. 4, 1994

[54] MODULAR DISPLAY SIMULATOR AND METHOD

[75] Inventor: Rick L. Moncrief, San Jose, Calif.

[73] Assignee: Atari Games Corporation, Milpitas, Calif.

[21] Appl. No.: 22,783

[22] Filed: Feb. 23, 1993

Related U.S. Application Data

[63] Continuation of Ser. No. 704,373, May 23, 1991, abandoned.

[51] Int. Cl.⁵ .......................... G09B 9/02; G09B 19/16
[52] U.S. Cl. ............................................ 434/29; 434/38;
434/69; 434/307; 273/85 G; 273/437; 358/104;
364/410; 364/578; 345/1; 345/126
[58] Field of Search ....................... 434/29, 38, 69, 307,
434/308; 364/410, 578; 340/717, 727, 745;
358/87; 273/85R, 85G, 14P, 433, 434, 437,
DIG. 28

[56] References Cited

U.S. PATENT DOCUMENTS

| | | |
|---|---|---|
| 3,514,871 | 6/1970 | Tucker . |
| 3,659,920 | 5/1972 | McGlasson . |
| 3,996,672 | 12/1976 | Osofsky et al. . |
| 4,345,817 | 8/1982 | Gwynn . |
| 4,352,664 | 10/1982 | Morrison et al. . |
| 4,373,169 | 2/1983 | Burkam ............................. 358/104 |
| 4,477,069 | 10/1984 | Crudgington, Jr. . |
| 4,521,014 | 6/1985 | Sitrick . |
| 4,542,903 | 9/1985 | Yokoi et al. . |
| 4,572,509 | 2/1986 | Sitrick . |
| 4,672,541 | 6/1987 | Bromley et al. . |
| 4,740,779 | 4/1988 | Cleary et al. ....................... 340/705 |
| 4,760,388 | 7/1988 | Tatsumi et al. ..................... 340/717 |
| 4,761,641 | 8/1988 | Schreiber ............................. 340/717 |
| 4,807,202 | 2/1989 | Cherri et al. . |
| 4,817,948 | 4/1989 | Simonelli . |
| 4,831,368 | 5/1989 | Masimo et al. ................. 340/724 X |
| 4,857,905 | 8/1989 | Ogawa . |
| 4,891,633 | 1/1990 | Imazeki et al. ..................... 340/717 |
| 4,949,119 | 8/1990 | Moncrief et al. . |
| 4,960,117 | 10/1990 | Moncrief et al. . |
| 4,969,647 | 11/1990 | Mical et al. . |
| 5,005,148 | 4/1991 | Behensky et al. . |
| 5,015,189 | 5/1991 | Wenringer, Jr. ................. 434/69 X |
| 5,044,956 | 9/1991 | Behensky et al. . |
| 5,047,754 | 9/1991 | Akatsuka et al. ............... 340/717 X |

FOREIGN PATENT DOCUMENTS

| | | |
|---|---|---|
| 0443928 | 8/1991 | European Pat. Off. . |
| 2164301 | 9/1984 | United Kingdom . |
| 2153189 | 12/1984 | United Kingdom . |

Primary Examiner—Richard J. Apley
Assistant Examiner—Joe H. Cheng
Attorney, Agent, or Firm—Knobbe, Martens, Olson & Bear

[57] ABSTRACT

A vehicle simulator has three video monitors which display three respective windows, i.e., sectors, of a simulated space. Each of the monitors is held in a respective housing, and each housing is mounted on the simulator. Also, a respective video controller is associated with each monitor, and each controller is mounted on the housing of the associated monitor.

One of the controllers is a master controller which calculates a reference position representative of the position of the simulated vehicle in a simulated space, based upon user-generated control signals. A signal representing the reference position is transmitted from the master controller to the two slave controllers. Based upon the reference position, each of the controllers generates a video display of a predetermined sector of the simulated space and causes its associated monitor to present the predetermined sector. The sectors that are displayed on the monitors which are associated with the slave controllers are offset by a predetermined angular amount from the sector displayed by the monitor of the master controller, so that the sector displayed by each monitors is congruent with the physical position of its respective monitor. The predetermined sector calculated by each slave controller can be relatively easily changed by appropriately changing the value of the angular offset which is established for the controller.

19 Claims, 3 Drawing Sheets

MODULAR DISPLAY SIMULATOR AND METHOD

This application is a continuation of application Ser. No. 07/704,373, filed May 23, 1991, now abandoned.

FIELD OF THE INVENTION

The present invention relates generally to video-based simulators. More particularly, the present invention relates to simulators which use a plurality of video monitors to present a panoramic view of simulated space through which a simulated vehicle moves. The present invention is particularly, though not exclusively, useful for modelling the motion of an aircraft or automobile through space, for training or entertainment purposes.

BACKGROUND OF THE PERTINENT TECHNOLOGY

The use of vehicle simulators which simulate the operation of vehicles, such as race cars and aircraft, for entertainment is becoming widespread. Also, apparatus which simulate the operation of vehicles are increasingly being used as training devices for government and industry vehicle operators. Such apparatus can be programmed to realistically simulate the motion of a vehicle through two or three-dimensional space, and can also provide relatively realistic simulation of the control of the vehicle. Importantly, it is safer and more cost effective for a person to be entertained or trained on a video simulator, as compared with a real vehicle. It is to be understood that for purposes of the present invention, a "simulator" may be a conventional simulator, which presents a visual model of a simulated space, or a simulator which presents an image of a so-called "virtual reality" or "artificial reality". Such a simulator can stimulate one or more of the five human senses to present a more complete model of a "true" reality.

Typically, a vehicle simulator has a computer which displays on a monitor a constantly changing video picture of a simulated three dimensional space. The "window" presented on the monitor is ordinarily the view of the simulated space as would be seen from the driver's seat of the simulated vehicle. Thus, as the simulated vehicle "moves" through the simulated space, the video display is constantly updated by the computer to model the motion of the vehicle.

Whether the vehicle simulator is to be used for training or entertainment, it is desirable to provide the operator of the simulated vehicle with a panoramic display of the simulated space through which the simulated vehicle is to travel. This is to provide a more effective simulation of the view that an operator of a vehicle to be modelled would see from the driver's seat of the actual modelled vehicle.

Not surprisingly, devices have been proposed which use more than a single video monitor to provide a panoramic "window" of the simulated space. Representative of these devices is the invention disclosed in U.S. Pat. No. 3,996,672 to Osofsky et al., which describes an aircraft simulator that uses three video monitors to display a panoramic window of a simulated space. As the simulated aircraft described in the Osofsky et al. patent moves through the simulated space, the images presented on the video monitors are updated as appropriate to model the motion of the aircraft.

As envisioned by the Osofsky et al. simulator, each of the three monitors is spatially congruent with the sector of simulated space displayed on the monitor. More specifically, the images presented on each monitor have the same perspective to the viewer as would the corresponding real-world objects that would occupy the same sector of space as that presented by the particular monitor.

While effective for its intended purpose, it is unfortunately the case that to coordinate the windows presented by each monitor to display a panoramic view of the simulated space, the monitors of the Osofsky et al. flight simulator require relatively powerful video drivers to relay the video commands from the controller to each of the three monitors. As a further consequence, relatively powerful electrical drivers are required to drive the relatively larger electrical harnesses to conduct the video commands from the controller to each of the three monitors.

As is well-known in the art, such electrical harnesses can, when energized, induce electromagnetic signals that can interfere with the operation of nearby electrical equipment. Besides being technically undesirable, such interference may not comport with governmental regulations regarding acceptable levels of electromagnetic interference. Accordingly, relatively lengthy electrical harnesses typically must be electrically shielded. Unfortunately, shielding of harnesses increases driver power requirements, which in combination with the shielded longer harnesses increases the expense of the apparatus, as compared to apparatus that use short harnesses with energy contents that do not require shielding. Further, depending on a variety of factors, such shielding may not be completely effective in preventing electromagnetic interference.

In addition to the above-mentioned drawbacks, it is the case that the video monitors many, if not most, multi-monitor simulators cannot be easily relocated from one position on the simulator to another, and still maintain spatial congruence between the relocated monitor and the "window" presented on the monitor. This is unfortunate, because it may be desirable, depending on the application of the particular simulator, to move the location of a monitor on the simulator as utilization requirements dictate, while maintaining congruence between the monitor and the sector of simulated space displayed on the monitor. For example, in an automobile simulator, it may be desirable to present a view of the simulated space behind the position of the driver, to support practicing driving the simulated automobile in reverse.

The present invention recognizes that it is possible to provide a multi-monitor simulator in which one or more of the monitors can relatively easily be relocated on the simulator, and still maintain congruence between the monitor and the sector of simulated space displayed on the monitor. Accordingly, it is an object of the present invention to provide a multi-monitor vehicle simulator in which one or more of the monitors can relatively easily be relocated on the simulator, while maintaining congruence between the relocated monitor and the sector of simulated space displayed on the monitor.

It is a further object of the present invention to provide a multi-monitor vehicle simulator which does not require comparatively powerful video drivers.

A further object of the present invention is to provide a multi-monitor vehicle simulator which does not require the use of relatively lengthy electrical harnesses and concomitant peripheral equipment which would otherwise be required to reduce electromagnetic interference from the harness.

Yet another object of the present invention is to provide a multi-monitor vehicle simulator which is relatively easy and effective to use, and comparatively cost-effective to manufacture.

The present invention is accordingly a compact multichannel simulator which, because of its compact nature, can be used in many existing training and entertainment facilities.

SUMMARY OF THE INVENTION

A modular display vehicle simulator for modelling the motion of a simulated vehicle through a simulated space has a base and a plurality of housings, preferably three or more, mounted on the base. The housings are mounted on the base in close proximity to each other. In one embodiment, each housing is juxtaposed with at least one other housing. A video monitor and an associated video controller, to which the monitor is electrically connected, are mounted in each housing. Also, simulated control devices, such as a steering wheel and throttle controls, are mounted on the base for generating control signals which are processed in accordance with the present invention. The control signals are representative of the motion of the simulated vehicle through the simulated space that is desired by the operator of the simulator.

One of the controllers is a master controller which calculates a reference position based upon the control signal from the control devices. Periodically, (e.g., about ten to thirty times per second), the master controller updates the reference position. In accordance with the present invention, the reference position is the simulated position of the vehicle in the simulated space. The master controller is electrically connected to at least one slave controller. In the presently preferred embodiment, the master controller is electrically connected to two slave controllers for transmitting a signal representative of the reference position to the slave controllers.

In response to the reference position signal, each slave controller calculates a perspective of the sector of space (i.e., a "window") and the objects within the space that are to be presented on the associated monitor, and causes the associated monitor to display the calculated sector. Each of the displayed sectors has a predetermined orientation, relative to the reference position.

Importantly, the displayed sectors are spatially congruent with their associated monitors. More particularly, the monitors occupy the sectors of space that would be occupied in "real life" by the space and objects which are presented, in simulated form, on the respective monitor. Thus, each sector is oriented, relative to the reference position, such that the axis of each window, from foreground to background, is coincident with the axis of the monitor which presents the window, from the front of the monitor which is observed by the operator to the back of the monitor. When a monitor is relocated on the base, the particular orientation of each window can be changed as necessary to maintain congruence between the window and associated monitor by appropriately manipulating a switch which is electrically connected to the controller of the particular monitor.

The present invention is accordingly a compact multichannel simulator which, because of its compact nature, can be used in many existing training and entertainment facilities. Further, the volume behind the CRT face plates in each monitor can be used to hold display channel electronics and thus save space and avoid the need for additional housing racks for the electronics.

The details of the present invention, as well as the operation of the invention, can best be understood by reference to the drawings, in which like numerals refer to like parts.

DESCRIPTION OF A PREFERRED EMBODIMENT

Figure 1:
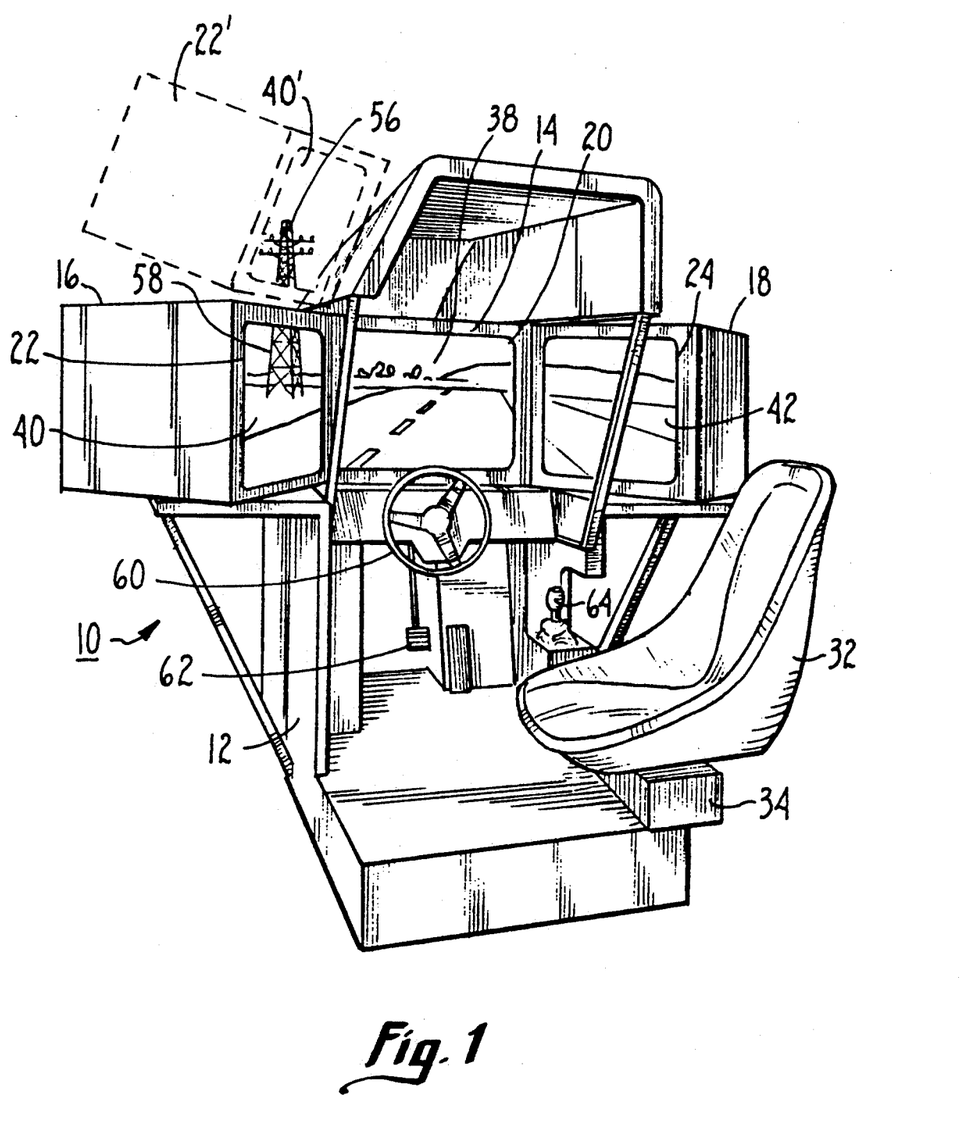
FIG. 1 is a perspective view of one presently preferred embodiment of the modular display simulator of the present invention.

Referring initially to FIG. 1, a modular display simulator is shown, generally designated 10. As shown, the simulator 10 has a base 12 and three housings 14, 16, and 18 which are mounted on the base 12. FIG. 1 shows that the housing 14 is juxtaposed with the housings 16 and 18. Each housing 14, 16, 18 has a respective video monitor 20, 22, 24 mounted therein. Preferably, the monitors 20, 22, and 24 are suitable for displaying, in color, computer-generated videographics. While FIG. 1 shows that the simulator 10 has three monitors 20, 22, 24, it is to be understood that the simulator 10 can include two monitors, or any number of monitors greater than three, within space constraints. Furthermore, while the simulator 10 as disclosed herein is an automobile simulator, it is to be understood that the simulator of the present invention can be used as a flight simulator or for simulating motion of any other vehicle.

A seat 32 is shown in FIG. 1, and the seat 32 is rotationally attached to a support beam 34. The support beam 34 is in turn pivotally attached to the base 12. It will be appreciated by the skilled artisan that an operator (not shown in FIG. 1) can sit in the seat 32 and position the seat 32 so that the operator faces the monitors 20, 22, 24, with the monitors 20, 22, 24 approximately at eye level to the operator.

Accordingly, it can be further appreciated in reference to FIG. 1 that the monitors 20, 22, and 24 together display a panoramic view of a simulated space, and the simulated space displayed on the monitors moves as the operator of the simulator 10 sits in the seat 32 and "drives" a simulated automobile through the simulated space. Specifically, the monitor 20 displays an image of a sector 38 of the simulated space. As contemplated by the present invention, the orientation of the sector 38, along with the positions and orientations of the objects within the sector 38, change with simulated motion of the simulated vehicle. More specifically, the monitor 20 presents a display of the sector 38 of the simulated space as would be seen through a window of the vehicle being simulated. In other words, the monitor 20 presents a "window" which shows the sector 38 in perspective as seen from the position of the operator in the simulated space. Similarly, the monitors 22, 24 present "window" displays of respective sectors 40, 42 of the simulated space.

FIG. 1 also shows a means attached to the base 12 for generating signals for controlling the simulated motion of the simulated vehicle. More particularly, a steering wheel 60 is rotationally mounted on the base 12, and an accelerator pedal 62 is pivotably attached to the base 12. Also, a gear shift lever 64 is pivotably connected to the base 12. Other control means, e.g., a brake pedal and clutch pedal (not shown) can also be provided on the simulator 10, if desired. It will be appreciated that the operator of the simulator 10 can manipulate the steering wheel 60, accelerator pedal 62, and gear shift lever 64 as appropriate to generate a control signal for controlling the simulated motion of the simulated vehicle. U.S. Pat. No. 4,949,119 to Moncrief et al., assigned to the same assignee as the present invention, fully discloses the structure and operation of one presently preferred embodiment of the gear shift lever 64 that may be used with the invention disclosed herein. Also, U.S. patent application Ser. No. 296,472 for an invention entitled "Control Device as a Steering Wheel for Video Vehicle Simulator with Realistic Feedback Forces", assigned to the same assignee as the present invention, describes the operation of one preferred embodiment of the steering wheel 60. The above-referenced patent and patent application are incorporated herein by reference.

Figure 2:
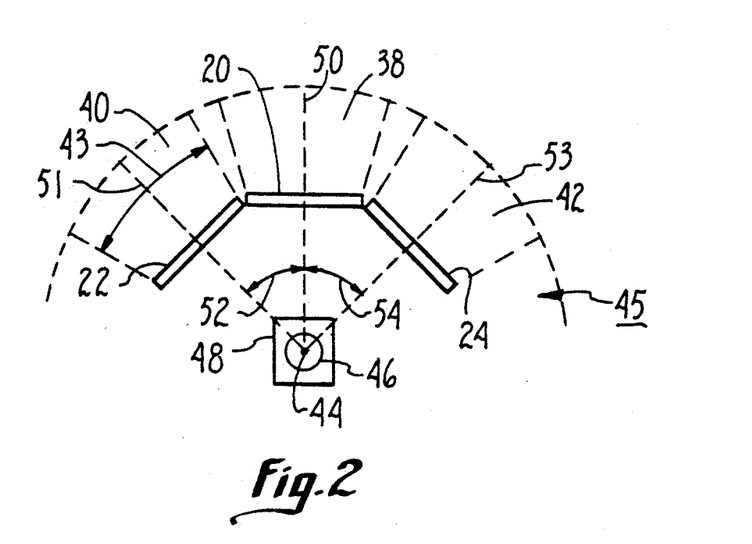
FIG. 2 is a block diagram of a presently preferred embodiment of the electrical components of the modular display simulator of the present invention.

It is to be appreciated in cross-reference to FIGS. 1 and 2 that the monitors 20, 22, 24 are preferably spatially congruent with their respective displays. More particularly, each of the monitors 20, 22, and 24 preferably displays its respective sector 38, 40, 42 such that each sector 38, 40, 42 has a predetermined orientation relative to a reference position 44 within the simulated space, generally designated 45, shown in FIG. 2. In the preferred embodiment, the reference position 44 is the simulated position of the operator 46 of the simulator 10 within the simulated space 45. As envisioned by the present invention, the simulated space 45 has an elevation extending from directly above the position 44 of operator 46 to the simulated horizon as would be seen from the position 44. Also, the simulated space 45 has an azimuth of three hundred sixty degrees (360) relative to the position 44.

In accordance with the preferred embodiment of the present invention, the monitor 20 presents a view of the simulated space 45 that would be seen through the front windshield of the vehicle 48, as viewed by the user 46. Accordingly, to establish spatial congruence between the monitor 20 and its displayed sector 38, the sector 38 is that sector of the simulated space which is oriented directly in front of the position 44 of the operator 46, i.e., along the axis 50 of the simulated vehicle 48.

On the other hand, the monitors 22, 24 are offset, by respective predetermined angles 52, 54, from the monitor 20. Thus, to establish spatial congruence between the monitors 22, 24 and their respective displayed sectors 40, 42, in the preferred embodiment the respective orientations of the displayed sectors 40, 42 are offset from the axis 50 of the simulated vehicle 48 by the angles 52, 54.

Stated differently, the respective axes 50, 51, and 53 of each sector 38, 40, 42 from the foreground of the particular sector to the background is preferably coincident with the axis of the respective monitor 20, 22, 24, from the front of the particular monitor which is viewed by the operator to the back of the monitor.

In the embodiment shown, the angle 52 is approximately equal to fifty three (53) degrees, and the angle 54 is about equal to minus fifty three ($-53$) degrees. It is to be understood, however, that the angles 52, 54 can have other values. It is to be further understood that while FIG. 2 shows that the angles 52, 54 represent an offset between the monitors 20, 22, and 24 which is in two dimensions, any two or three of the monitors 20, 22, and 24 can be positioned on the base 12 such that the offset between monitors has a component in a third dimension. For example, the monitor 22 can be moved to the position on the base 12 indicated by the monitor 22', as shown in FIG. 1. The controller 28 of the monitor 22 can be reset in accordance with disclosure below so that the sector 40' displayed by the monitor in position 22' is spatially congruent with the monitor in position 22'. As an example, in the embodiment shown, the sector 40' displays the top 56 of the simulated transmission pole 58.

Figure 3:
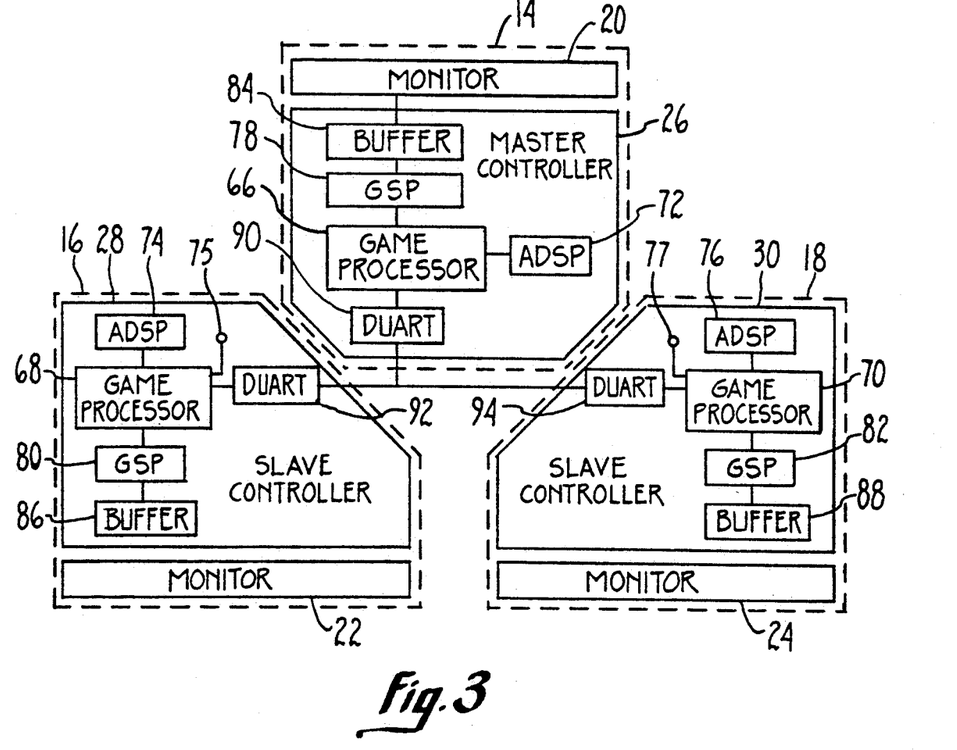
FIG. 3 is a schematic view of the modular display simulator of the present invention, as seen from a top-down perspective, showing the simulated vehicle within the simulated space.

Now referring to FIG. 3, the details of the electrical components of the simulator 10 can be seen. As shown in FIG. 3, each housing 14, 16, 18 holds a respective video controller 26, 28, 30, and each video controller is electrically connected to its respective monitor. More particularly, for purposes of disclosure the video controller 26 is a master controller, and is electrically connected to the monitor 20. Also, the controllers 28, 30 are slave controllers, and are electrically connected to their respective monitors 22, 24 and to the master controller 26.

As further shown in FIG. 3, each controller 26, 28, and 30 includes a respective game processor 66, 68, and 70. Each game processor 66, 68, and 70 is any suitable microprocessor which can rapidly calculate the sector to be displayed, and which also maintains in electronic memory a map of the space 45. In one preferred embodiment, each game processor is a type 68010 microprocessor manufactured by Motorola Corporation. As will be more fully disclosed below, the game processors 68, 70 of the respective slave controllers 28, 30 receive inputs generated by respective hardware or software switches 75, 77 for establishing a predetermined orientation offset for the sectors 40, 42 relative to the sector 38.

Still referring to FIG. 3, the game processor 66 of the master controller 26 is electrically connected to the steering wheel 60, the accelerator pedal 62, and the gear shift lever 64. Accordingly, electrical control signals which are generated by the steering wheel 60, accelerator pedal 62, and gear shift lever 64 are sent to the game processor 66.

FIG. 3 also shows that each controller 26, 28, and 30 includes a respective image calculation engine, referred to herein as an ADSP 72, 74, 76 which is electrically connected to its associated game processor. Each ADSP includes an ADSP 2100 series microprocessor manufactured by Analog Devices. Each of the ADSPs 72, 74, 76 maintains in its electronic memory a listing of the objects within the simulated space 45 (shown in FIG. 2) for access of the data stored in the listing by associated signal processing equipment, as more fully disclosed below. This listing contains a data base of objects within the space 45, such as trees and buildings, and movable objects within the space 45, e.g., birds, aircraft, and other ground vehicles. The particular data organization within the blackboard can be any well-known means for organizing data which permits efficient data retrieval and storage.

The orientation offsets established by the switches 75, 77 can have components in two or three dimensions, as desired. Stated differently, the switches 75, 77 can establish orientation offsets for the sectors 40, 42 vis-a-vis the sector 38 in the azimuthal and elevational dimensions. Specifically, in the presently preferred embodiment each switch 75, 77 is a software switch that has a value stored in nonvolitional zero-power RAM. The values for the switches 75, 77 can be set by the operator of the simulator 10 to any one of several predetermined azimuth and pitch offsets. The values of these offsets are established based upon the particular application of the simulator 10. It is to be understood that the offsets established by the switches 75, 77 can have any azimuthal value from 0 to ±180 degrees and any elevational value from 0 to ±180 degrees. It is to be further understood that the switches 75, 77 can be hardware switches, e.g., the switches 75, 77 can be rotary potentiometers.

Additionally, each controller 26, 28, 30 has a respective graphics signal processor (GSP) 78, 80, 82 which is electrically connected to its associated game processor. Each GSP 78, 80, 82 is any suitable electronic device which fills image buffers to be displayed on its respective monitor 20, 22, 24 in response to graphics signals from the associated game processor 66, 68, 70. In one presently preferred embodiment, each GSP is a Texas Instrument component 34010. As shown in FIG. 3, each GSP is electrically connected to a respective video frame buffer 84, 86, 88, and the frame buffers 84, 86, and 88 are respectively electrically connected to the monitors 20, 22, 24.

Still referring to FIG. 3, each controller 26, 28, and 30 includes a respective dual universal asynchronous receiver transmitter (DUART) 90, 92, and 94. Each DUART 90, 92, 94 is a device, such as a type MC68681 manufactured by Motorola Corporation, which is suitable for converting parallel data from its respective game processor 66, 68, 70 into serial data for transmission to another DUART, and for converting serial data received from another DUART into parallel data for processing by the associated game processor 66, 68, 70. Thus, the DUART 90 of the master controller 26 is electrically connected to the DUARTs 92, 94 of the slave controllers 28, 30, for transmitting data from the master controller 26 to the slave controllers 28, 30. In an alternative embodiment, the DUARTs 90, 92, 94 could be replaced with suitable parallel cables.

Figure 4:
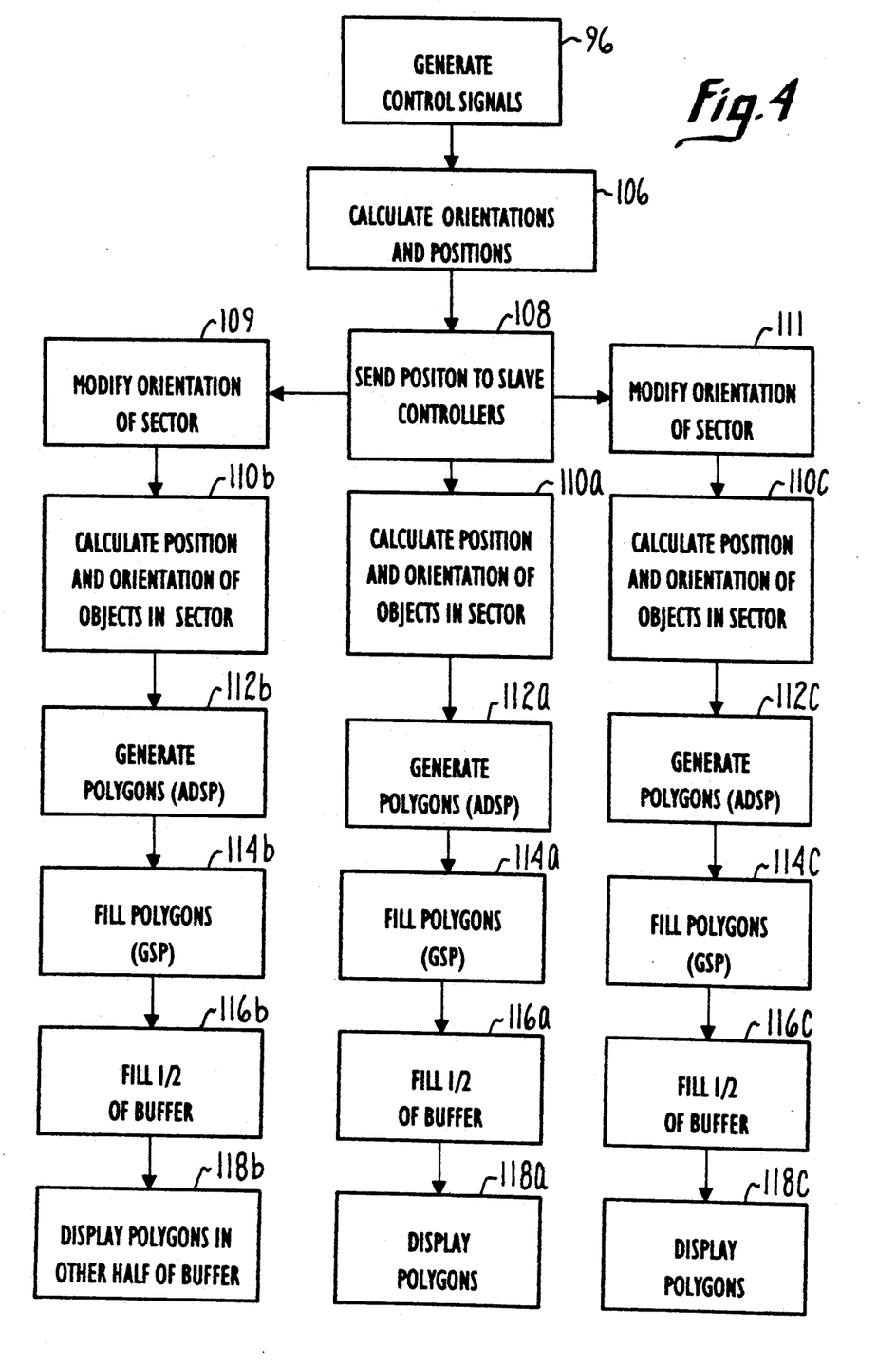
FIG. 4 is a flow diagram illustrating the operational steps of the modular display simulator of the present invention.

In describing the steps of a single cycle of operation of the simulator 10, reference is made to FIGS. 2, 3, and 4. For ease of disclosure, blocks which are labelled with a numeral followed by the letter "a" represent steps that are performed by the master controller 26. On the other hand, blocks which are labelled with a numeral followed by the letter "b" represent steps which are performed by the slave controller 28, and blocks which are labelled with a numeral followed by the letter "c" represent steps which are performed by the slave controller 30.

The operator 46 (shown in FIG. 2) of the simulator 10 can manipulate the steering wheel 60, accelerator pedal 62, and gear shift lever 64. The positions of these physical devices at any point in time are reflected by sensors (not shown) such as photodetectors affixed within the vehicle simulator 10 to detect the positions of the steering wheel 60, accelerator pedal 62, and shift lever 64. Upon the initiation of an operational cycle, as indicated at block 96, the system receives position indicating signals from the various sensors and, in response thereto, generates corresponding control signals for controlling the desired simulated motion of the simulated vehicle 48 through the simulated space 45. An example of how such a control signal is generated and subsequently used by a signal processor, such as the game processor 66, is disclosed in the above-referenced U.S. Pat. No. 4,949,119. The control signals representing positions of the wheel 60, pedal 62, and lever 64 are sent via respective electrical lines 98, 102, and 104 to the game processor 66 of the master controller 26, as shown in FIG. 3.

The system next moves to block 106 of FIG. 4, wherein the game processor 66, in conjunction with a math coprocessor, if necessary, calculates the reference position and orientation of the simulated vehicle 48 in the simulated space 45, shown in FIG. 2, based upon the previous position of the vehicle 48 in the space 45 and the control signals from the wheel 60, pedal 62, and lever 64. Any suitable method may be used to calculate the orientation and position of the vehicle 48 based upon the previous position, velocity, and acceleration of the vehicle 48 and the signals from the wheel 60, pedal 62, lever 64, and other controls (e.g., a clutch pedal and a brake pedal).

For example, the orientation and position of the vehicle 48 can be calculated by any method suitable for the particular application of the simulator 10. For example, a simple point and thrust orientation and position control algorithm can be used for applications of the simulator 10 wherein it is desirable for the simulated vehicle to "fly" around a predetermined point in the simulated space. As another alternative, wherein limited vehicle notion fidelity is acceptable, the orientation and position of the vehicle 48 can be calculated using any one of the algorithms used to control aircraft positions and orientations in popular video home games. As yet another alternative, the orientation and position of the vehicle 48 can be calculated using any one of the algorithms used to control aircraft positions and orientations in high fidelity aircraft simulators which are used for training commercial or military aviators or astronauts.

As a further and preferred means for calculating the orientation and position of the vehicle 48, a free body model can be used. More specifically, the game processor 66, in conjunction with a math coprocessor that can contain a data base of the drivable road surfaces, continuously calculates a new orientation and position of the vehicle 48 based upon the previous position, velocity, and acceleration of the vehicle 48 and the signals from the controls of the simulator 10. A free body algorithm similar to the equations of flight in a high fidelity flight simulator is preferably used.

The system next moves to block 108, wherein a reference position signal, which represents both the reference position and orientation of the simulated vehicle 48 as calculated by the game processor 66, is then sent to the DUART 90, where the reference position signal is converted to serial format. From the DXJART 90, the signal is sent to the DUARTs 92, 94 of the slave controllers 28, 30. The DUARTs 92, 94 convert the signal back to parallel data and send the signal to their respective game processors 68, 70.

As indicated at blocks 109, 111, respectively, the slave controllers 28, 30 establish the orientation of the sectors 40, 42 in accordance with a predetermined angular offset. Specifically, the game processor 68 determines the angle 52 (shown in FIG. 2) based upon the setting of the switch 75, shown in FIG. 3. More specifically, the game processor 68 records the reference position 44, sent from the game processor 66, the orientation of the axis 50, also sent from the game processor 66, and the rotation around the axis 50. Then, the game processor 68 establishes the axis 51 and rotation around the axis 51 of the sector 40 to originate from the reference position 44 and to be offset from the axis 50 of the sector 38 by an angle 52, which corresponds to the setting on the switch 75. Preferably, the switch 75 is set to establish an angle 52 which will result in spatial congruence between the monitor 22 and the sector 40. Also, the game processor 68 has, in its electronic memory, data which represents the predetermined angular width 43 of the sector 40. Thus, the game processor 68 essentially determines the orientation of the axis 51 of the sector 40, as well as the area of the space 45 that encompasses the sector 40.

Likewise, the game processor 70 determines the angle 54 (shown in FIG. 2) based upon the setting of the switch 77, shown in FIG. 3. It can now be further understood that the switch 77 can have settings which correspond to a plurality of potentially desired values for the angle 54. Preferably, the switch 77 is set to establish an angle 54 which will result in spatial congruence between the monitor 24 and the sector 42. Moreover, the game processor 70 has, in its electronic memory, data which represents the angular width 45 of the sector 42. Thus, the game processor 70 essentially determines what area of the space 45 comprises the sector 42.

Having modified the respective sector orientations, the system moves to blocks 110a, 110b, 110c. In accordance with the present invention, the game processing by each controller 20, 22, 24 described below is done asynchronously with respect to the other controllers. Specifically, the master controller 20 periodically sends the reference signal to the slave controllers 22, 24, which process the signal independently from the other controllers. More specifically, in the event that one of the slave controllers 22, 24 completes one processing cycle as described below before the master controller 20 sends an updated reference signal to the particular slave controller 22, 24, the particular slave controller 22, 24 continues to display the image that was based upon the last received reference position signal. The particular slave controller 22 or 24 then awaits the arrival of a new reference position signal to commence processing a new image based upon the new reference position signal.

Alternatively, however, the slave controller 22, 24 can commence another computational cycle based upon a linear extrapolation of the reference position. To accomplish this extrapolation, the particular slave controller 22, 24 assumes that the speed and direction of the simulated vehicle 48 have the same values as calculated between the two immediately previous reference position signals from the master controller 20.

In blocks 110a, 110b, 110c, the reference position signal is processed by each of the game processors 66, 68, 70. Specifically, as indicated at block 110a, the game processor 66 calculates the orientation and position of each of the objects that are stored in the data listing of the electronic memory of the game processor 66 and which are within the sector 38. More specifically, the game processor 66 determines the distance between the position of the simulated vehicle 48 and each of the objects within the sector 38 by computational processes well-known in the art. Then, based upon the distance between the simulated vehicle 48 and each object within the sector 38, and the orientation of each object relative to the vehicle 48 as next described, the game processor 66 calculates the relative size, as would appear from the position of the vehicle 48, of each object within the sector 38, again by computational processes well-known in the art.

The game processor 66 also calculates the perspective of each object within the sector 38 as would be seen from the position of the simulated vehicle 48. The relative size and orientation of each object within the sector 38 is then sent to ADSP 72. In other words, the game processor 66 calculates the content and perspective of the "window" which is to be displayed on the monitor 20.

As indicated at blocks 110b, 110c, the game processors 68, 70 of the slave controllers 28, 30 calculate the positions and orientations of the objects within the respective sectors 40, 42, based upon the reference position signal from the master controller 26. Specifically, the game processor 68 calculates the orientation and position of each of the objects that are stored in the electronic memory of the game processor 68 and which are within the sector 40. More specifically, the game processor 68 determines the distance between the position of the simulated vehicle 48 and the orientation of each of the objects within the sector 40. Then, based upon the distance and orientation between the simulated vehicle 48 and each object within the sector 40, the game processor 68 calculates the relative size and perspective, as would appear from the position of the vehicle 48, of each object within the sector 40, by computational processes well-known in the art.

Accordingly, it is to be understood that the game processors 68, 70 calculate the size and perspective of each object within the respective sectors 40, 42 as would be seen from the position of the simulated vehicle 48 in substantially the same way as the game processor 66 calculation of the sector 38 described above.

Next, the system moves to blocks 112a-c, wherein each of the ADSPs 72, 74, 76 generates signals that are representative of the particular sector to be displayed. Each signal generated by the ADSPs 72, 74, 76 at blocks 112a-c contains data defining the boundaries of polygons that are combined to form the visual images of objects in the sectors 38, 40, 42. In accordance with the present invention, the signals from the ADSPs 72, 74, 76 are sent to the respective GSPs 78, 80, 82. The system then moves to blocks 114a-c, wherein each of the GSPs 78, 80, 82 "fills" buffers with a plurality of polygons with color data received from the respective ADSPs 72, 74, 76. This color data is representative of the predetermined color of the various objects to be presented on the monitors 14, 16, 18.

The system next moves to blocks 116a-c, wherein each GSP 78, 80, 82 deletes, i.e., clears, "old" polygons stored in a first half of its respective video buffer 84, 86, 88 and fills this first half of its buffer 84, 86, 88 with the polygons generated by the GSP. Simultaneously, as indicated at blocks 118a-c, the polygons which were previously stored in the remaining (i.e., second) half of the buffers 84, 86, 88 are respectively displayed by the monitors 20, 22, 24. In the next succeeding cycle, the displayed polygons in the second half of the buffers 84, 86, 88 will be deleted and replaced with "new" polygons from the GSPs 78, 80, and 82, and the polygons in the first half of the buffers 84, 86, 88 will be displayed on the respective monitors 20, 22, 24. The process repeats for successive cycles of the operation of the simulator 10. In one preferred embodiment, the simulator 10 updates the displays presented on the monitors 20, 22, 24 between ten times and thirty times per second.

It is to be appreciated in reference to the above disclosure that the monitors 22, 24 can be relocated on the base 12 to display other perspectives of the simulated space 45, while still maintaining spatial congruence with the sector displayed on the particular monitor. For example, the monitor 22 can be moved to the location indicated by the monitor 22', and the switch 75 manipulated to establish the orientation offset of the sector 40' which is appropriate for maintaining spatial congruence between the monitor 22' and the sector 40'.

Furthermore, the housing of one of the slave monitors, e.g., the housing 16 of the monitor 22, can be pivotably attached to the base 12 by any suitable means well-known in the art. For example, the housing 16 can be attached to a pivot arm, and the pivot arm pivotably connected to the base 12. Accordingly, in such an embodiment the monitor 22 is pivotably attached to the base 12, and can be moved relative to the base 12 by the operator of the simulator 10. In accordance with this embodiment, the pivot arm can be engaged with the switch 75 such that as the housing 16 is moved, the portion of the space 45 which is congruent with the monitor 22 is displayed on the monitor 22. This embodiment is useful in, e.g., vehicle backing exercises that require a view of the simulated space 45 that is wider than the monitors 20, 22, 24.

It is to be appreciated in reference to the disclosure above that the present invention overcomes the long-standing problem of how to easily relocate one or more monitors in a multi-monitor simulator, while still maintaining spatial congruence between the relocated monitor and its associated displayed sector. Further, by physically housing each monitor with its associated video controller, the present invention provides a relatively compact system. Moreover, by distributing the processing function, the present invention dispenses with the requirement for comparatively powerful video drivers, lengthy transmission cables, and the concomitant electromagnetic shielding requirements which attend lengthy cable runs.

While the particular modular display simulator as herein shown and described in detail is fully capable of achieving the stated objectives, it is to be understood that the scope of the present invention is to be limited by nothing other than the limitations set forth in the appended claims.

I claim:

1. A device for displaying a changing video image of a simulated space having a reference position, which comprises:
    a base;
    a first housing mounted on said base;
    at least one control input device that provides a control signal to cause a simulated movement through a simulated space;
    a first video monitor mounted on said first housing;
    a first memory mounted on said first housing for storing data representative of a simulated space;
    a first controller mounted on said first housing and connected to said control input device, to said first monitor and to said first memory, said first controller calculating a reference position in response to said control signal and generating a position signal representative of said reference position, said first controller generating a display of a first sector of said simulated space on said first monitor based upon said position signal and data in said first memory;
    a second housing mounted on said base;
    a second video monitor mounted on said second housing;
    a second memory mounted on said second housing for storing data representative of the simulated space; and
    a second controller mounted on said second housing and connected to said second monitor, said first controller and said second memory, said second controller generating a display of a second sector of said simulated space based upon said position signal from said first controller and the data stored in the second memory,
    wherein said first and second controllers respectively generate said displays of said first and second sectors on said first and second monitors substantially when said first controller calculates said reference position.

2. The device as recited in claim 1, wherein said control input device comprises manual means connected to said first controller for generating said control signal, and wherein said first controller periodically calculates said reference position in response to said control signal.

3. The device as recited in claim 1, wherein the spatial relationship between said first and second sectors of said simulated space is congruent with the spatial relationship between said first and second monitors.

4. The device recited in claim 3, further comprising a switch connected to said second controller for selectively changing the spatial relationship of said second sector of said simulated space relative to said first sector of said simulated space.

5. The device as recited in claim 1, further comprises:
    a third housing mounted on said base;
    a third video monitor mounted on said third housing;
    a third memory for storing data representative of the simulated space; and
    a third controller mounted on said third housing and connected to said third monitor, said first controller and said third memory, said third controller responsive to said data in said third memory and said reference signal from said first controller to generate signals to cause said third monitor to display a third sector of said simulated space based upon said position signal from said first controller and the data stored in the third memory.

6. The device recited in claim 1, further comprising a switch connected to said second controller for selectively changing the spatial relationship of said second sector of said simulated space relative to said first sector of said simulated space.

7. A simulator for presenting a display of a simulated space, which comprises:
    a control input means for generating a control signal;
    a first video monitor;
    a first memory for storing data representative of a simulated space;
    a master controller connected to said control input means, said first monitor and said first memory, said master controller generating signals to cause said first monitor to display a first portion of said simulated space which is spatially congruent with said first monitor, said master controller further generating a reference signal representative of a reference position of said first portion of said simulated space in response to simulated movement within said simulated space;

a second video monitor juxtaposed with said first monitor;

a second memory for storing data representative of the simulated space; and a slave controller connected to said master controller, said second monitor and said second memory, said slave controller generating signals based upon said reference signal from said master controller and said data in said second memory to cause said second monitor to display a second portion of said simulated space which is spatially congruent with said second monitor, wherein said master controller periodically calculates said reference position in response to said control signal transmitted from said control input means, and wherein said master and slave controllers respectively generate said displays of said first and second portions of said simulated space on said first and second monitors substantially when said master controller calculates said reference position.

8. The simulator as recited in claim 7, further comprising:

a first housing for holding said first monitor and said master controller;

a second housing for holding said second monitor and said slave controller; and a base for holding said first and second housings.

9. The simulator as recited in claim 8, wherein the spatial relationship between said displays of said first and second portions of said simulated space on said first and second monitors is congruent with the spatial relationship between said first and second monitors.

10. The simulator as recited in claim 9, further comprising a switch connected to said slave controller for selectively changing the spatial relationship of said display of said first portion of said simulated space on said second monitor relative to said display of said first portion of said simulated space on said first monitor when a position of said second monitor is changed with respect to said first monitor.

11. The simulator as recited in claim 8, further comprising:

a third housing mounted on said base;

a third video monitor mounted on said third housing;

a third memory for storing data representative of the simulated space;

a third controller mounted on said third housing and connected to said third monitor, said master controller and said third memory, said third controller generating signals based upon said reference signal from said master controller and the data stored in the third memory to cause said third monitor to display a third portion of said simulated space which is spatially congruent with said third monitor.

12. The device recited in claim 7, further comprising a switch connected to said slave controller for selectively changing the spatial relationship of said second portion of said simulated space of said second monitor relative to said first portion of said simulated space of said first monitor.

13. A device for generating a changing image of a simulated space, which comprises:

a base having means attached thereto for generating a control signal representative of a desired motion through the simulated space;

a first memory for storing data representative of the simulated space;

a first monitor mounted on said base;

a master controller connected to said control signal generating means, said first monitor and said first memory, said master controller calculating a reference position based upon said control signal from said control signal generating means and said data stored in said first memory and generating signals to cause said fist monitor to present a first window displaying a first section of said simulated space having a predetermined orientation relative to said reference position, said master controller generating a position signal corresponding to said reference position;

a second memory for storing data representative of the simulated space;

a second monitor mounted on said base; and a slave controller connected to said master controller, said second monitor and said second memory, said slave controller responsive to said data stored in the second memory and said position signal from said master controller to generate signals to cause said second monitor to preset a second window displaying a second sector of said simulated space with a predetermined orientation relative to said reference position based upon said position signal and data stored in said second memory, the spatial relationship between said first and second sectors being congruent with the spatial relationship between said first and second monitor, wherein said master and slave controllers respectively generate said first and second sectors of said simulated space on said first and second monitors substantially when said master controller calculates said reference position.

14. The device as recited in claim 13, wherein said master controller periodically calculates said reference position in response to said control signal.

15. The device as recited in claim 14, wherein said master controller calculates said reference position about ten (10) times per second.

16. The device as recited in claim 13, further comprising:

a third monitor mounted on said base;

a third memory for storing data representative of the simulated space; and a third controller connected to said third monitor, said master controller and said third memory, said third controller responsive to said data stored in said third memory and said position signal from said master controller to generate signals to cause said third monitor to present a third window displaying a third sector of said simulated space with a predetermined orientation relative to said reference position based upon said position signal from said master controller and said data stored in the third memory.

17. A method for presenting images of a simulated space on the monitors as seen from a simulator having a selectable position and orientation in the simulated space, said simulator having a control input means, the first, second and third monitors, the first, second and third memories, and the master and first and second slave controllers, said method comprises:

storing data representative of the simulated space in the first and second memories;

generating a control signal representative of the desired movement of the simulator through the simulated space from the control input means;

processing the control signal in the master controller to generate a reference signal representative of the position and orientation of the simulator in the simulated space;

generating a first display signal in said master controller based upon the reference signal and said data stored in the first memory;

displaying a first image of the simulated space on the first monitor in response to the first display signal, the first image being spatially congruent with the first monitor;

generating a second display signal in the first slave controller based upon the reference signal from said master controller and said data stored in the second memory; and displaying a second image of the simulated space on the second monitor in response to the second display signal, the second image being spatially congruent with the second monitor, wherein said master controller periodically calculates said reference signal in response to a control signal transmitted from said control input means, and wherein said master and first slave controllers respectively generate said first and second images of said simulated space on said first and second monitors substantially when said master controller calculates said reference position.

18. The method of claim 17, further comprising the steps of:

storing data representative of the simulated space in a third memory;

generating a third display signal in a second slave controller based upon the reference signal from said master controller and said data stored in the third memory; and displaying a third image of the simulated space on a third monitor in response to the third display signal, the third image being spatially congruent with the third monitor.

19. The method of claim 17, wherein the spatial relationship of the second monitor with the first monitor can be selectively changed by a switch to establish the spatial congruence between the second image of a position changed second monitor and the first image of the first monitor.

* * * * *